US012360492B2

(12) United States Patent
Yonetoku et al.

(10) Patent No.: US 12,360,492 B2
(45) Date of Patent: Jul. 15, 2025

(54) ELECTROPHOTOGRAPHIC PHOTORECEPTOR, PROCESS CARTRIDGE, AND IMAGE FORMING APPARATUS

(71) Applicant: FUJIFILM Business Innovation Corp., Tokyo (JP)

(72) Inventors: Yuki Yonetoku, Kanagawa (JP); Takeshi Kawai, Kanagawa (JP); Masaki Hirakata, Kanagawa (JP); Satoshi Mizoguchi, Kanagawa (JP); Hideya Katsuhara, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/457,025

(22) Filed: Aug. 28, 2023

(65) Prior Publication Data

US 2024/0319661 A1 Sep. 26, 2024

(30) Foreign Application Priority Data

Mar. 24, 2023 (JP) ................................ 2023-049076

(51) Int. Cl.

| | |
|---|---|
| ***G03G 5/00*** | (2006.01) |
| ***G03G 5/14*** | (2006.01) |
| ***G03G 5/147*** | (2006.01) |
| ***G03G 15/00*** | (2006.01) |
| ***G03G 15/02*** | (2006.01) |
| ***G03G 21/18*** | (2006.01) |

(52) U.S. Cl.
CPC ......... *G03G 21/1839* (2013.01); *G03G 5/142* (2013.01); *G03G 5/14708* (2013.01); *G03G 15/0216* (2013.01); *G03G 15/75* (2013.01); *G03G 2221/183* (2013.01)

(58) Field of Classification Search
CPC .... G03G 5/047; G03G 5/142; G03G 5/14708; G03G 15/0216; G03G 15/75; G03G 21/1839; G03G 2221/183
See application file for complete search history.

(56) References Cited

U.S. PATENT DOCUMENTS

| | | | | |
|---|---|---|---|---|
| 2019/0346781 | A1* | 11/2019 | Katsuhara | G03G 5/047 |
| 2020/0012205 | A1* | 1/2020 | Kigoshi | G03G 15/75 |
| 2024/0302764 | A1* | 9/2024 | Saito | G03G 15/0216 |

FOREIGN PATENT DOCUMENTS

| | | | |
|---|---|---|---|
| JP | 10-207099 | A | 8/1998 |
| JP | 2000-122326 | A | 4/2000 |
| JP | 2004-205581 | A | 7/2004 |
| JP | 2007-264146 | A | 10/2007 |

* cited by examiner

*Primary Examiner* — Sophia S Chen
(74) *Attorney, Agent, or Firm* — Sughrue Mion, PLLC

(57) ABSTRACT

An electrophotographic photoreceptor includes a conductive substrate, an undercoat layer provided on the conductive substrate, a charge generation layer provided on the undercoat layer, a charge transport layer provided on the charge generation layer, and a surface organic protective layer provided on the charge transport layer, in which the charge transport layer has a Young's modulus of 5,500 MPa or greater.

20 Claims, 2 Drawing Sheets

ELECTROPHOTOGRAPHIC PHOTORECEPTOR, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2023-049076 filed Mar. 24, 2023.

BACKGROUND

(i) Technical Field

The present invention relates to an electrophotographic photoreceptor, a process cartridge, and an image forming apparatus.

(ii) Related Art

The formation of an image by an electrophotographic method is performed, for example, by charging a surface of a photoreceptor, forming an electrostatic charge image on the surface of the photoreceptor according to image information, developing the electrostatic charge image with a developer containing a toner to form a toner image, and transferring and fixing the toner image to a surface of a recording medium.

Here, JP2004-205581A discloses "an image forming apparatus including a photoreceptor and a charging unit that uniformly charges a surface of the photoreceptor, in which the photoreceptor includes a conductive support, and a photosensitive layer and a protective layer that are provided on the conductive support, the protective layer contains a curable resin cured by irradiation with electron beams and conductive particles, the photoreceptor has a Taber abrasion of 0.1 to 1.0 (mg/1000 rotations), the charging unit includes a charging member disposed in contact with the surface of the photoreceptor, a charging bias application power supply that applies a charging bias, in which a DC voltage and an AC voltage are superimposed, to the charging member and charges the surface of the photoreceptor, and a control unit that performs AC voltage control on the charging bias, and the control unit determines an AC voltage value in a case where the AC voltage control is performed based on the application time of the charging bias".

SUMMARY

Aspects of non-limiting embodiments of the present disclosure relate to an electrophotographic photoreceptor that includes a conductive substrate, an undercoat layer provided on the conductive substrate, a charge generation layer provided on the undercoat layer, a charge transport layer provided on the charge generation layer, and a surface organic protective layer provided on the charge transport layer, in which defects of the surface organic protective layer are suppressed as compared with a case where the charge transport layer has a Young's modulus of less than 5,500 MPa.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Means for solving the above-described problems include the following aspect.

According to an aspect of the present disclosure, there is provided an electrophotographic photoreceptor including a conductive substrate; an undercoat layer provided on the conductive substrate; a charge generation layer provided on the undercoat layer; a charge transport layer provided on the charge generation layer; and a surface organic protective layer provided on the charge transport layer, in which the charge transport layer has a Young's modulus of 5,500 MPa or greater.

BRIEF DESCRIPTION OF THE DRAWINGS

Exemplary embodiment(s) of the present invention will be described in detail based on the following FIGURES, wherein.

DETAILED DESCRIPTION

Figure 1:
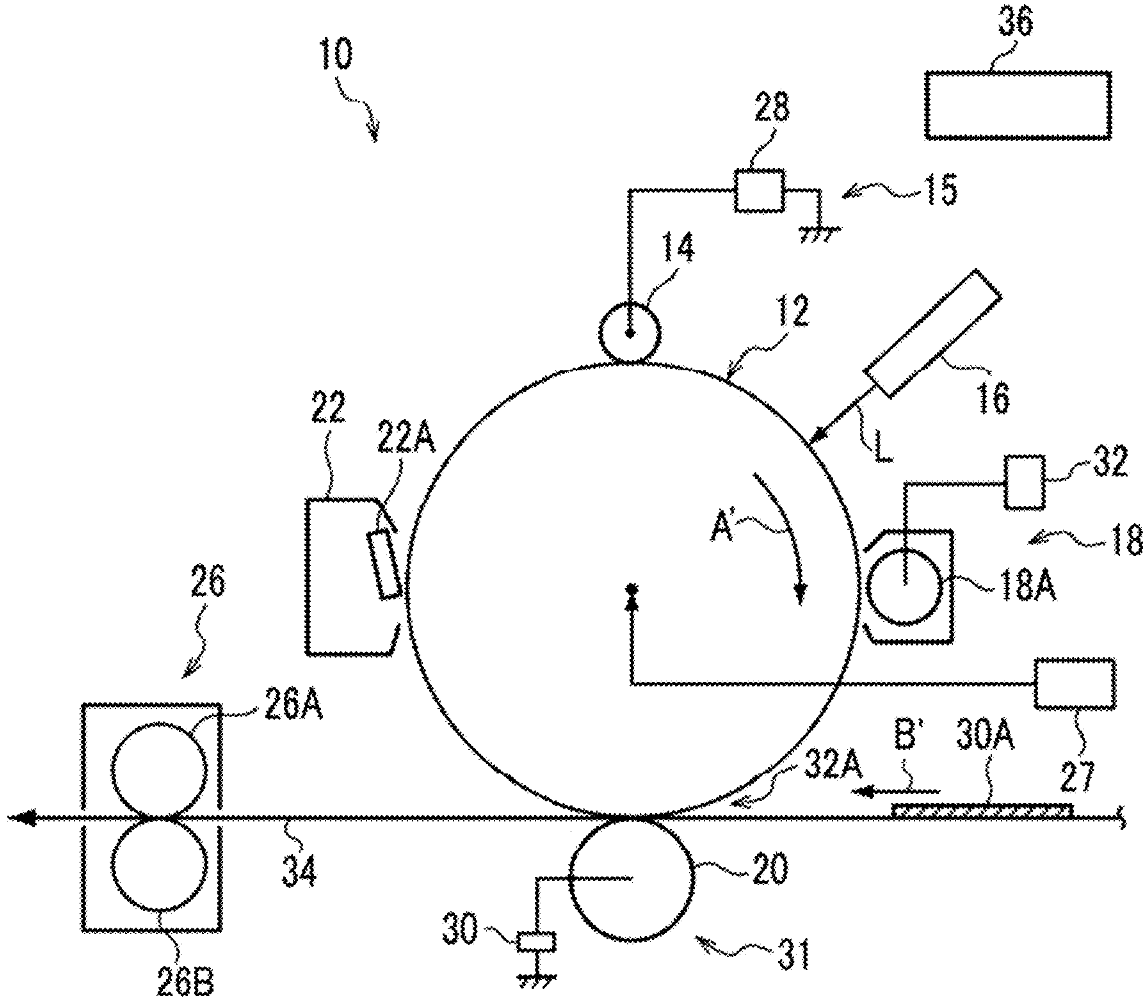
FIG. 1 is a schematic configuration view showing an example of an image forming apparatus according to the present exemplary embodiment.

Hereinafter, exemplary embodiments that are examples of the present invention will be described. The following descriptions and examples merely illustrate the present invention, and do not limit the present invention.

In the present specification, a numerical range shown using "to" indicates a range including numerical values described before and after "to" as a minimum value and a maximum value.

In a numerical range described in a stepwise manner in the present specification, an upper limit or a lower limit described in a certain numerical range may be replaced with an upper limit or a lower limit in another numerical range described in a stepwise manner. Further, in a numerical range described in the present disclosure, an upper limit value or a lower limit value described in the numerical range may be replaced with a value shown in Examples.

In the present disclosure, the meaning of the term "step" includes not only an independent step but also a step whose intended purpose is achieved even in a case where the step is not clearly distinguished from other steps.

In the present disclosure, in a case where an exemplary embodiment is described with reference to drawings, the configuration of the exemplary embodiment is not limited to the configuration shown in the drawings. In addition, the sizes of members in each drawing are conceptual and the relative relation in the sizes between the members is not limited thereto.

In the present specification, each component may include a plurality of kinds of substances corresponding to each component. In the present disclosure, in a case where a plurality of kinds of substances corresponding to each component in a composition are present, the amount of each component in the composition indicates the total amount of the plurality of kinds of substances present in the composition unless otherwise specified.

In the present specification, "electrophotographic photoreceptor" will also be referred to as "photoreceptor".

Electrophotographic Photoreceptor

Figure 2:
FIG. 2 is a cross-section of a photoreceptor according to the present exemplary embodiment.

A photoreceptor according to the present exemplary embodiment is shown in FIG. 2 and includes a conductive substrate 37, an undercoat layer 38 provided on the conductive substrate, a charge generation layer 39 provided on the undercoat layer, a charge transport layer 40 provided on the charge generation layer, and a surface organic protective layer 41 provided on the charge transport layer.

Further, in the photoreceptor according to the present exemplary embodiment, the charge transport layer has a Young's modulus of 5,500 MPa or greater.

With the above-described configuration of the photoreceptor according to the present exemplary embodiment, defects of the surface organic protective layer are suppressed. The reason for this is assumed as follows.

In the related art, for the purpose of reducing abrasion of the surface and extending the life, a photoreceptor including a conductive substrate, an undercoat layer provided on the conductive substrate, a charge generation layer provided on the undercoat layer, and a charge transport layer provided on the charge generation layer, in which a surface organic protective layer is further provided on the charge transport layer is known.

However, in a case where the surface organic protective layer is abraded and is thus thinned due to repeated image formation, defects accompanied by peeling of the surface organic protective layer may occur. In a case where the surface organic protective layer is thinned, for example, in a case where inclusions such as toner particles and carriers are sandwiched between the photoreceptor, an intermediate transfer member, a contact type charging member, and the like, the surface of the photoreceptor is stressed due to the inclusions and is thus likely to be greatly recessed. In this manner, it is considered that a stress is concentrated on the interface between the charge transport layer and the surface organic protective layer, and the surface organic protective layer is peeled off at the interface with the charge transport layer.

Meanwhile, in a case where the Young's modulus of the charge transport layer is increased to 5,500 MPa or greater, the surface of the photoreceptor is difficult to greatly recess due to a stress applied by the inclusions even in a case where the surface organic protective layer is thinned due to abrasion. Therefore, concentration of a stress on the interface between the charge transport layer and the surface organic protective layer is difficult to occur.

As described above, it is assumed that in the photoreceptor according to the present exemplary embodiment, defects of the surface organic protective layer are suppressed.

Hereinafter, the photoreceptor according to the present exemplary embodiment will be described in detail.

Young's Modulus of Charge Transport Layer

The Young's modulus of the charge transport layer is 5,500 MPa or greater, and is, for example, preferably 6,300 MPa or greater and more preferably 6,500 MPa or greater from the viewpoint of suppressing defects of the surface organic protective layer.

Examples of a method of setting the Young's modulus of the charge transport layer to be in the above-described ranges include a method of adjusting the thicknesses of the charge transport layer and the undercoat layer. Specifically, the method is as follows.

The thickness of the charge transport layer is, for example, preferably 9 μm or greater and 18 μm or less, more preferably 9 μm or greater and 15 μm or less, and still more preferably m or greater and 13 μm or less. Particularly, in a case where the thickness of the charge transport layer is 9 μm or greater (or 10 μm), charge leakage is also likely to be suppressed.

The thickness of the undercoat layer is, for example, preferably 19 μm or greater and 31 μm or less, more preferably 19 μm or greater and 24 μm or less, and still more preferably 20 μm or greater and 24 μm or less. Particularly, in a case where the thickness of the undercoat layer is 19 μm or greater (or 20 μm), current leakage due to sticking of needle-like foreign matter is also likely to be suppressed.

The ratio of the thickness of the charge transport layer to the thickness of the undercoat layer (thickness of charge transport layer/thickness of undercoat layer) is, for example, preferably 9/31 or greater and 18/19 or less and more preferably 9/24 or greater and 15/19 or less.

The total thickness of the charge transport layer and the undercoat layer is, for example, preferably 28 μm or greater and 49 μm or less and more preferably 28 μm or greater and 39 μm or less.

Particularly, in a case where the thickness of the surface organic protective layer is 9 μm or greater and 15 μm or less, the thickness of the charge transport layer is 9 μm or greater and 24 μm or less, and the ratio of the thickness of the charge transport layer to the thickness of the surface organic protective layer (thickness of charge transport layer/thickness of surface organic protective layer) is 9/24 or greater and 15/19 or less, defects of the surface organic protective layer are also likely to be suppressed.

Here, the Young's modulus of the charge transport layer is a value measured in a state where the undercoat layer, the charge generation layer, and the charge transport layer are provided in this order on the conductive substrate.

A specific method of measuring the Young's modulus of the charge transport layer is as follows.

First, samples including the photoreceptor to be measured, from the substrate to the surface organic protective layer, are collected. Further, samples without the surface organic protective layer may be separately prepared and measured.

Next, each sample is set in a measuring device (PICODENTOR HM500, manufactured by Fischer Instruments K.K.) in an environment of a temperature of 23° C. and 30% RH. Further, a load is continuously increased on the surface of the charge transport layer in a state of being provided on the sample by using a Vickers indenter, and the surface is pressed with a load of 35 mN. Further, in a case where the indenter is pushed in, an indentation depth-load curve is measured, the load is applied at a maximum indentation depth, and the inclination of an unloading curve in a case where of unloading is acquired as the Young's modulus. Here, the value measured here does not indicate a general Young's modulus peculiar to a material.

Five sites of a sample at positions spaced by 40 mm and 80 mm from both ends of the photoreceptor and a central portion of the photoreceptor are collected as the measurement sites, and the average value of the measured values of five samples is calculated.

Structure of Each Layer of Photoreceptor

Hereinafter, each layer of the photoreceptor according to the present exemplary embodiment will be described in detail.

Conductive Substrate

Examples of the conductive substrate include metal plates containing metals (such as aluminum, copper, zinc, chromium, nickel, molybdenum, vanadium, indium, gold, and platinum) or alloys (such as stainless steel), metal drums, metal belts, and the like. Further, examples of the conductive substrate include paper, a resin film, a belt, and the like obtained by being coated, vapor-deposited or laminated with a conductive compound (such as a conductive polymer or indium oxide), a metal (such as aluminum, palladium, or gold) or an alloy. Here, the term "conductive" denotes that the volume resistivity is less than $10^{13}$ Ωcm.

In a case where the electrophotographic photoreceptor is used in a laser printer, for example, it is preferable that the surface of the conductive substrate is roughened such that a centerline average roughness Ra thereof is 0.04 μm or greater and 0.5 μm or less for the purpose of suppressing interference fringes from occurring in a case of irradiation with laser beams. Further, in a case where incoherent light is used as a light source, roughening of the surface to prevent interference fringes is not particularly necessary, and roughening of the surface to prevent interference fringes is appropriate for longer life because occurrence of defects due to the roughness of the surface of the conductive substrate is suppressed.

Examples of the roughening method include wet honing performed by suspending an abrasive in water and spraying the suspension to the conductive substrate, centerless grinding performed by pressure-welding the conductive substrate against a rotating grindstone and continuously grinding the conductive substrate, and an anodizing treatment.

Examples of the roughening method also include a method of dispersing conductive or semi-conductive powder in a resin without roughening the surface of the conductive substrate to form a layer on the surface of the conductive substrate, and performing roughening using the particles dispersed in the layer.

The roughening treatment performed by anodization is a treatment of forming an oxide film on the surface of the conductive substrate by carrying out anodization in an electrolytic solution using a conductive substrate made of a metal (for example, aluminum) as an anode. Examples of the electrolytic solution include a sulfuric acid solution and an oxalic acid solution. However, a porous anodized film formed by anodization is chemically active in a natural state, is easily contaminated, and has a large resistance fluctuation depending on the environment. Therefore, for example, it is preferable that a sealing treatment is performed on the porous anodized film so that the fine pores of the oxide film are closed by volume expansion due to a hydration reaction in pressurized steam or boiling water (a metal salt such as nickel may be added thereto) for a change into a more stable a hydrous oxide.

The film thickness of the anodized film is, for example, preferably 0.3 μm or greater and 15 μm or less. In a case where the film thickness is in the above-described range, the barrier properties against injection tend to be exhibited, and an increase in the residual potential due to repeated use tends to be suppressed.

The conductive substrate may be subjected to a treatment with an acidic treatment liquid or a boehmite treatment.

The treatment with an acidic treatment liquid is carried out, for example, as follows. First, an acidic treatment liquid containing phosphoric acid, chromic acid, and hydrofluoric acid is prepared. In the blending ratio of phosphoric acid, chromic acid, and hydrofluoric acid to the acidic treatment liquid, for example, the concentration of the phosphoric acid is 10% by mass or greater and 11% by mass or less, the concentration of the chromic acid is 3% by mass or greater and 5% by mass or less, and the concentration of the hydrofluoric acid is 0.5% by mass or greater and 2% by mass or less, and the concentration of all these acids may be 13.5% by mass or greater and 18% by mass or less. The treatment temperature is, for example, preferably 42° C. or higher and 48° C. or lower. The film thickness of the coating film is, for example, preferably 0.3 μm or greater and 15 μm or less.

The boehmite treatment is carried out, for example, by immersing the conductive substrate in pure water at 90° C. or higher and 100° C. or lower for 5 minutes to 60 minutes or by bringing the conductive substrate into contact with heated steam at 90° C. or higher and 120° C. or lower for 5 minutes to 60 minutes. The film thickness of the coating film is, for example, preferably 0.1 μm or greater and 5 μm or less. This coating film may be further subjected to the anodizing treatment using an electrolytic solution having low film solubility, such as adipic acid, boric acid, a borate, a phosphate, a phthalate, a maleate, a benzoate, a tartrate, or a citrate.

Undercoat Layer

The undercoat layer is, for example, a layer containing inorganic particles and a binder resin.

Examples of the inorganic particles include inorganic particles having a powder resistance (volume resistivity) of $10^2$ Ωcm or greater and $10^{11}$ Ωcm or less.

Among these, as the inorganic particles having the above-described resistance value, for example, metal oxide particles such as tin oxide particles, titanium oxide particles, zinc oxide particles, and zirconium oxide particles may be used, and zinc oxide particles are particularly preferable.

The specific surface area of the inorganic particles measured by the BET method may be, for example, 10 $m^2/g$ or greater.

The volume average particle diameter of the inorganic particles may be, for example, 50 nm or greater and 2,000 nm or less (for example, preferably 60 nm or greater and 1,000 nm or less).

The content of the inorganic particles is, for example, preferably 10% by mass or greater and 80% by mass or less and more preferably 40% by mass or greater and 80% by mass or less with respect to the amount of the binder resin.

The inorganic particles may be subjected to a surface treatment. As the inorganic particles, inorganic particles subjected to different surface treatments or inorganic particles having different particle diameters may be used in the form of a mixture of two or more kinds thereof.

Examples of the surface treatment agent include a silane coupling agent, a titanate-based coupling agent, an aluminum-based coupling agent, and a surfactant. In particular, for example, a silane coupling agent is preferable, and a silane coupling agent containing an amino group is more preferable.

Examples of the silane coupling agent containing an amino group include 3-aminopropyltriethoxysilane, N-2-(aminoethyl)-3-aminopropyltrimethoxysilane, N-2-(aminoethyl)-3-aminopropylmethyldimethoxysilane, and N,N-bis (2-hydroxyethyl)-3-aminopropyltriethoxysilane, but are not limited thereto.

The silane coupling agent may be used in the form of a mixture of two or more kinds thereof. For example, a silane coupling agent containing an amino group and another silane coupling agent may be used in combination. Examples of other silane coupling agents include vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane, but are not limited thereto.

The surface treatment method using a surface treatment agent may be any method as long as the method is a known method, and any of a dry method or a wet method may be used.

The treatment amount of the surface treatment agent is, for example, preferably 0.5% by mass or greater and 10% by mass or less with respect to the amount of the inorganic particles.

Here, the undercoat layer may contain an electron-accepting compound (acceptor compound) together with the inorganic particles, for example, from the viewpoint of enhancing the long-term stability of the electrical properties and the carrier blocking properties.

Examples of the electron-accepting compound include electron-transporting substances, for example, a quinone-based compound such as chloranil or bromanil; a tetracyanoquinodimethane-based compound; a fluorenone compound such as 2,4,7-trinitrofluorenone or 2,4,5,7-tetranitro-9-fluorenone; an oxadiazole-based compound such as 2-(4-biphenyl)-5-(4-t-butylphenyl)-1,3,4-oxadiazole, 2,5-bis(4-naphthyl)-1,3,4-oxadiazole, or 2,5-bis(4-diethylaminophenyl)-1,3,4-oxadiazole; a xanthone-based compound; a thiophene compound; a diphenoquinone compound such as 3,3',5,5'-tetra-t-butyldiphenoquinone; and a benzophenone compound.

In particular, as the electron-accepting compound, for example, a compound having an anthraquinone structure is preferable. As the compound having an anthraquinone structure, for example, a hydroxyanthraquinone compound, an aminoanthraquinone compound, or an aminohydroxyanthraquinone compound is preferable, and specifically, for example, anthraquinone, alizarin, quinizarin, anthrarufin, or purpurin is preferable.

The electron-accepting compound may be contained in the undercoat layer in a state of being dispersed with inorganic particles or in a state of being attached to the surface of each inorganic particle.

Examples of the method of attaching the electron-accepting compound to the surface of the inorganic particle include a dry method and a wet method.

The dry method is, for example, a method of attaching the electron-accepting compound to the surface of each inorganic particle by adding the electron-accepting compound dropwise to inorganic particles directly or by dissolving the electron-accepting compound in an organic solvent while stirring the inorganic particles with a mixer having a large shearing force and spraying the mixture together with dry air or nitrogen gas. The electron-accepting compound may be added dropwise or sprayed, for example, at a temperature lower than or equal to the boiling point of the solvent. After the dropwise addition or the spraying of the electron-accepting compound, the compound may be further baked at 100° C. or higher. The baking is not particularly limited as long as the temperature and the time are adjusted such that the electrophotographic characteristics can be obtained.

The wet method is, for example, a method of attaching the electron-accepting compound to the surface of each inorganic particle by adding the electron-accepting compound to inorganic particles while dispersing the inorganic particles in a solvent using a stirrer, ultrasonic waves, a sand mill, an attritor, or a ball mill, stirring or dispersing the mixture, and removing the solvent. The solvent removing method is carried out by, for example, filtration or distillation so that the solvent is distilled off. After removal of the solvent, the mixture may be further baked at 100° C. or higher. The baking is not particularly limited as long as the temperature and the time are adjusted such that the electrophotographic characteristics can be obtained. In the wet method, the moisture contained in the inorganic particles may be removed before the electron-accepting compound is added, and examples thereof include a method of removing the moisture while stirring and heating the moisture in a solvent and a method of removing the moisture by azeotropically boiling the moisture with a solvent.

Further, the electron-accepting compound may be attached to the surface, for example, before or after the inorganic particles are subjected to a surface treatment with a surface treatment agent or simultaneously with the surface treatment performed on the inorganic particles with a surface treatment agent.

The content of the electron-accepting compound may be, for example, 0.01% by mass or greater and 20% by mass or less and preferably 0.01% by mass or greater and 10% by mass or less with respect to the amount of the inorganic particles.

Examples of the binder resin used for the undercoat layer include known polymer compounds such as an acetal resin (such as polyvinyl butyral), a polyvinyl alcohol resin, a polyvinyl acetal resin, a casein resin, a polyamide resin, a cellulose resin, gelatin, a polyurethane resin, a polyester resin, an unsaturated polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a urea resin, a phenol resin, a phenol-formaldehyde resin, a melamine resin, a urethane resin, an alkyd resin, and an epoxy resin, a zirconium chelate compound, a titanium chelate compound, an aluminum chelate compound, a titanium alkoxide compound, an organic titanium compound, and known materials such as a silane coupling agent.

Examples of the binder resin used for the undercoat layer include a charge-transporting resin containing a charge-transporting group, and a conductive resin (such as polyaniline).

Among these, as the binder resin used for the undercoat layer, for example, a resin insoluble in a coating solvent of the upper layer is preferable, and a resin obtained by reaction between a curing agent and at least one resin selected from the group consisting of a thermosetting resin such as a urea resin, a phenol resin, a phenol-formaldehyde resin, a melamine resin, a urethane resin, an unsaturated polyester resin, an alkyd resin, or an epoxy resin; a polyamide resin, a polyester resin, a polyether resin, a methacrylic resin, an acrylic resin, a polyvinyl alcohol resin, and a polyvinyl acetal resin is particularly preferable.

In a case where these binder resins are used in combination of two or more kinds thereof, the mixing ratio thereof is set as necessary.

The undercoat layer may contain various additives for improving the electrical properties, the environmental stability, and the image quality.

Examples of the additives include known materials, for example, an electron-transporting pigment such as a polycyclic condensed pigment or an azo-based pigment, a zirconium chelate compound, a titanium chelate compound, an aluminum chelate compound, a titanium alkoxide compound, an organic titanium compound, and a silane coupling agent. The silane coupling agent is used for a surface treatment of the inorganic particles as described above, but may be further added to the undercoat layer as an additive.

Examples of the silane coupling agent serving as an additive include vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane.

Examples of the zirconium chelate compound include zirconium butoxide, ethyl zirconium acetoacetate, zirconium triethanolamine, acetylacetonate zirconium butoxide, ethyl zirconium butoxide acetoacetate, zirconium acetate, zirconium oxalate, zirconium lactate, zirconium phosphonate, zirconium octanoate, zirconium naphthenate, zirconium laurate, zirconium stearate, zirconium isostearate, zirconium butoxide methacrylate, stearate zirconium butoxide, and isostearate zirconium butoxide.

Examples of the titanium chelate compound include tetraisopropyl titanate, tetranormal butyl titanate, a butyl titanate dimer, tetra(2-ethylhexyl) titanate, titanium acetylacetonate, polytitanium acetylacetonate, titanium octylene glycolate, titanium lactate ammonium salt, titanium lactate, titanium lactate ethyl ester, titanium triethanol aminate, and polyhydroxy titanium stearate.

Examples of the aluminum chelate compound include aluminum isopropylate, monobutoxyaluminum diisopropylate, aluminum butyrate, diethylacetoacetate aluminum diisopropylate, and aluminum tris(ethylacetoacetate).

These additives may be used alone or in the form of a mixture or a polycondensate of a plurality of compounds.

The undercoat layer may have, for example, a Vickers hardness of 35 or greater.

The surface roughness (ten-point average roughness) of the undercoat layer may be adjusted, for example, to ½ from 1/(4n) (n represents a refractive index of an upper layer) of a laser wavelength λ for exposure to be used to suppress moire fringes.

Resin particles or the like may be added to the undercoat layer to adjust the surface roughness. Examples of the resin particles include silicone resin particles and crosslinked polymethyl methacrylate resin particles. Further, the surface of the undercoat layer may be polished to adjust the surface roughness. Examples of the polishing method include buff polishing, a sandblast treatment, wet honing, and a grinding treatment.

The formation of the undercoat layer is not particularly limited, and a known forming method is used. For example, a coating film of a coating solution for forming an undercoat layer in which the above-described components are added to a solvent is formed, and the coating film is dried and, as necessary, heated.

Examples of the solvent for preparing the coating solution for forming an undercoat layer include known organic solvents such as an alcohol-based solvent, an aromatic hydrocarbon solvent, a halogenated hydrocarbon solvent, a ketone-based solvent, a ketone alcohol-based solvent, an ether-based solvent, and an ester-based solvent.

Specific examples of these solvents include typical organic solvents such as methanol, ethanol, n-propanol, iso-propanol, n-butanol, benzyl alcohol, methyl cellosolve, ethyl cellosolve, acetone, methyl ethyl ketone, cyclohexanone, methyl acetate, ethyl acetate, n-butyl acetate, dioxane, tetrahydrofuran, methylene chloride, chloroform, chlorobenzene, and toluene.

Examples of the method of dispersing the inorganic particles in a case of preparing the coating solution for forming an undercoat layer include known methods such as a roll mill, a ball mill, a vibration ball mill, an attritor, a sand mill, a colloid mill, and a paint shaker.

Examples of the method of coating the conductive substrate with the coating solution for forming an undercoat layer include typical coating methods such as a blade coating method, a wire bar coating method, a spray coating method, a dip coating method, a bead coating method, an air knife coating method, and a curtain coating method.

Interlayer

Although not shown in the FIGURES, an interlayer may be further provided between the undercoat layer and the photosensitive layer.

The interlayer is, for example, a layer containing a resin. Examples of the resin used for the interlayer include a polymer compound, for example, an acetal resin (such as polyvinyl butyral), a polyvinyl alcohol resin, a polyvinyl acetal resin, a casein resin, a polyamide resin, a cellulose resin, gelatin, a polyurethane resin, a polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a phenol-formaldehyde resin, or a melamine resin.

The interlayer may be a layer containing an organometallic compound. Examples of the organometallic compound used for the interlayer include an organometallic compound containing metal atoms such as zirconium, titanium, aluminum, manganese, and silicon.

The compounds used for the interlayer may be used alone or in the form of a mixture or a polycondensate of a plurality of compounds.

Among these, it is preferable that the interlayer is, for example, a layer containing an organometallic compound having a zirconium atom or a silicon atom.

The formation of the interlayer is not particularly limited, and a known forming method is used. For example, a coating film of a coating solution for forming an interlayer in which the above-described components are added to a solvent is formed, and the coating film is dried and, as necessary, heated.

Examples of the coating method of forming the interlayer include typical coating methods such as a dip coating method, a push-up coating method, a wire bar coating method, a spray coating method, a blade coating method, an air knife coating method, and a curtain coating method.

The film thickness of the interlayer is set to be, for example, preferably in a range of 0.1 μm or greater and 3 μm or less. Further, the interlayer may be used as the undercoat layer.

Charge Generation Layer

The charge generation layer is, for example, a layer containing a charge generation material and a binder resin. Further, the charge generation layer may be a deposition layer of the charge generation material. The deposition layer of the charge generation material is, for example, preferable in a case where an incoherent light source such as a light emitting diode (LED) or an organic electroluminescence (EL) image array is used.

Examples of the charge generation material include an azo pigment such as bisazo or trisazo; a fused ring aromatic pigment such as dibromoanthanthrone; a perylene pigment; a pyrrolopyrrole pigment; a phthalocyanine pigment; zinc oxide; and trigonal selenium.

Among these, for example, a metal phthalocyanine pigment or a metal-free phthalocyanine pigment is preferably used as the charge generation material in order to deal with laser exposure in a near infrared region. Specifically, for example, hydroxygallium phthalocyanine, chlorogallium phthalocyanine, dichloro-tin phthalocyanine, and titanyl phthalocyanine are more preferable.

On the other hand, for example, a fused ring aromatic pigment such as dibromoanthanthrone, a thioindigo-based pigment, a porphyrazine compound, zinc oxide, trigonal selenium, or a bisazo pigment is preferable as the charge generation material in order to deal with laser exposure in a near ultraviolet region.

The above-described charge generation material may also be used even in a case where an incoherent light source such as an LED or an organic EL image array having a center wavelength of light emission at 450 nm or greater and 780 nm or less is used, but from the viewpoint of the resolution, the field intensity in the photosensitive layer is increased, and a decrease in charge due to injection of a charge from the substrate, that is, image defects referred to as so-called black spots are likely to occur in a case where a thin film having a thickness of 20 μm or less is used as the photosensitive layer. The above-described tendency is evident in a case where a p-type semiconductor such as trigonal selenium or a phthalocyanine pigment is used as the charge generation material that is likely to generate a dark current.

On the other hand, in a case where an n-type semiconductor such as a fused ring aromatic pigment, a perylene pigment, or an azo pigment is used as the charge generation material, a dark current is unlikely to be generated, and image defects referred to as black spots can be suppressed even in a case where a thin film is used as the photosensitive layer.

Further, the n-type is determined by the polarity of the flowing photocurrent using a typically used time-of-flight method, and a material in which electrons more easily flow as carriers than positive holes is determined as the n-type.

The binder resin used for the charge generation layer is selected from a wide range of insulating resins, and the binder resin may be selected from organic photoconductive polymers such as poly-N-vinylcarbazole, polyvinylanthracene, polyvinylpyrene, and polysilane.

Examples of the binder resin include a polyvinyl butyral resin, a polyarylate resin (a polycondensate of bisphenols and aromatic divalent carboxylic acid), a polycarbonate resin, a polyester resin, a phenoxy resin, a vinyl chloride-vinyl acetate copolymer, a polyamide resin, an acrylic resin, a polyacrylamide resin, a polyvinylpyridine resin, a cellulose resin, a urethane resin, an epoxy resin, casein, a polyvinyl alcohol resin, and a polyvinylpyrrolidone resin. Here, the term "insulating" denotes that the volume resistivity is $10^{13}$ Ωcm or greater.

These binder resins may be used alone or in the form of a mixture of two or more kinds thereof.

Further, the blending ratio between the charge generation material and the binder resin is, for example, preferably in a range of 10:1 to 1:10 in terms of the mass ratio.

The charge generation layer may also contain other known additives.

The formation of the charge generation layer is not particularly limited, and a known forming method is used. For example, a coating film of a coating solution for forming a charge generation layer in which the above-described components are added to a solvent is formed, and the coating film is dried and, as necessary, heated. Further, the charge generation layer may be formed by vapor deposition of the charge generation material. The formation of the charge generation layer by vapor deposition is, for example, particularly appropriate in a case where a fused ring aromatic pigment or a perylene pigment is used as the charge generation material.

Examples of the solvent for preparing the coating solution for forming a charge generation layer include methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, and toluene. These solvents are used alone or in the form of a mixture of two or more kinds thereof.

As a method of dispersing particles (for example, the charge generation material) in the coating solution for forming a charge generation layer, for example, a media disperser such as a ball mill, a vibration ball mill, an attritor, a sand mill, or a horizontal sand mill, or a medialess disperser such as a stirrer, an ultrasonic disperser, a roll mill, or a high-pressure homogenizer is used. Examples of the high-pressure homogenizer include a collision type high-pressure homogenizer in which a dispersion liquid is dispersed by a liquid-liquid collision or a liquid-wall collision in a high-pressure state, and a penetration type high-pressure homogenizer in which dispersion is performed by causing a dispersion liquid to pass through a micro-flow path in a high-pressure state.

During the dispersion, it is effective to set the average particle diameter of the charge generation material in the coating solution for forming a charge generation layer to 0.5 μm or less, for example, preferably 0.3 μm or less, and more preferably 0.15 μm or less.

Examples of the method of coating the undercoat layer (or the interlayer) with the coating solution for forming a charge generation layer include typical methods such as a blade coating method, a wire bar coating method, a spray coating method, a dip coating method, a bead coating method, an air knife coating method, and a curtain coating method.

The film thickness of the charge generation layer is set to be, for example, in a range of preferably 0.1 μm or greater and 5.0 μm or less and more preferably in a range of 0.2 μm or greater and 2.0 μm or less.

Charge Transport Layer

The charge transport layer is, for example, a layer containing a charge transport material and a binder resin. The charge transport layer may be a layer containing a polymer charge transport material.

Examples of the charge transport material include a quinone-based compound such as p-benzoquinone, chloranil, bromanil, or anthraquinone; a tetracyanoquinodimethane-based compound; a fluorenone compound such as 2,4,7-trinitrofluorenone; a xanthone-based compound; a benzophenone-based compound; a cyanovinyl-based compound; and an electron-transporting compound such as an ethylene-based compound. Examples of the charge transport material include a positive hole-transporting compound such as a triarylamine-based compound, a benzidine-based compound, an arylalkane-based compound, an aryl-substituted ethylene-based compound, a stilbene-based compound, an anthracene-based compound, or a hydrazone-based compound. These charge transport materials may be used alone or in combination of two or more kinds thereof, but are not limited thereto.

From the viewpoint of the charge mobility, for example, a triarylamine derivative represented by Structural Formula (a-1) or a benzidine derivative represented by Structural Formula (a-2) is preferable as the charge transport material.

(a-1)

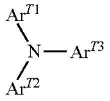

In Structural Formula (a-1), $Ar^{T1}$, $Ar^{T2}$, and $Ar^{T3}$ each independently represent a substituted or unsubstituted aryl group, $—C_6H_4—C(R^{T4})═C(R^{T5})(R^{T6})$, or $—C_6H_4—CH═CH—CH═C(R^{T7})(R^{T8})$. $R^{T4}$, $R^{T5}$, $R^{T6}$, $R^{T7}$, and $R^{T8}$ each independently represent a hydrogen atom, a substituted or unsubstituted alkyl group, or a substituted or unsubstituted aryl group.

Examples of the substituent of each group described above include a halogen atom, an alkyl group having 1 or more and 5 or less carbon atoms, and an alkoxy group having 1 or more and 5 or less carbon atoms. Further, examples of the substituent of each group described above include a substituted amino group substituted with an alkyl group having 1 or more and 3 or less carbon atoms.

(a-2)

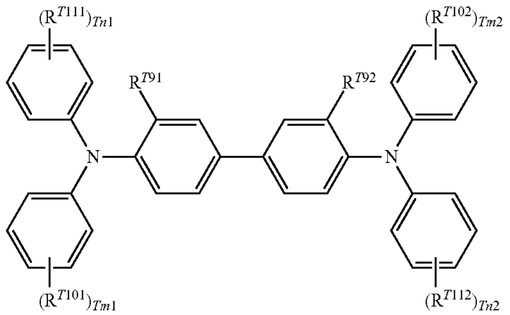

In Structural Formula (a-2), $R^{T91}$ and $R^{T92}$ each independently represent a hydrogen atom, a halogen atom, an alkyl group having 1 or more and 5 or less carbon atoms, or an alkoxy group having 1 or more and 5 or less carbon atoms. $R^{T101}$, $R^{T102}$, $R^{T111}$, and $R^{T112}$ each independently represent a halogen atom, an alkyl group having 1 or more and 5 or less carbon atoms, an alkoxy group having 1 or more and 5 or less carbon atoms, a substituted amino group substituted with an alkyl group having 1 or more and 2 or less carbon atoms, a substituted or unsubstituted aryl group, $—C(R^{T12})═C(R^{T13})(R^{T14})$, or $—CH═CH—CH═C(R^{T15})(R^{T16})$, and $R^{T12}$, $R^{T13}$, $R^{T14}$, $R^{T15}$, and $R^{T16}$ each independently represent a hydrogen atom, a substituted or unsubstituted alkyl group, or a substituted or unsubstituted aryl group. Tm1, Tm2, Tn1, and Tn2 each independently represent an integer of 0 or greater and 2 or less.

Examples of the substituent of each group described above include a halogen atom, an alkyl group having 1 or more and 5 or less carbon atoms, and an alkoxy group having 1 or more and 5 or less carbon atoms. Further, examples of the substituent of each group described above include a substituted amino group substituted with an alkyl group having 1 or more and 3 or less carbon atoms.

Here, among the triarylamine derivative represented by Structural Formula (a-1) and the benzidine derivative represented by Structural Formula (a-2), for example, a triarylamine derivative having "$—C_6H_4—CH═CH—CH═C(R^{T7})(R^{T8})$" and a benzidine derivative having "$—CH═CH—CH═C(R^{T15})(R^{T16})$" are particularly preferable from the viewpoint of the charge mobility.

As the polymer charge transport material, known materials having charge transport properties, such as poly-N-vinylcarbazole and polysilane, can be used. Particularly, for example, a polyester-based polymer charge transport material is particularly preferable. Further, the polymer charge transport material may be used alone or in combination of binder resins.

Examples of the binder resin used for the charge transport layer include a polycarbonate resin, a polyester resin, a polyarylate resin, a methacrylic resin, an acrylic resin, a polyvinyl chloride resin, a polyvinylidene chloride resin, a polystyrene resin, a polyvinyl acetate resin, a styrene-butadiene copolymer, a vinylidene chloride-acrylonitrile copolymer, a vinyl chloride-vinyl acetate copolymer, a vinyl chloride-vinyl acetate-maleic anhydride copolymer, a silicone resin, a silicone alkyd resin, a phenol-formaldehyde resin, a styrene-alkyd resin, poly-N-vinylcarbazole, and polysilane. Among these, for example, a polycarbonate resin or a polyarylate resin is preferable as the binder resin. These binder resins may be used alone or in combination of two or more kinds thereof.

Further, the blending ratio between the charge transport material and the binder resin is, for example, preferably in a range of 10:1 to 1:5 in terms of the mass ratio.

The charge transport layer may also contain other known additives.

The formation of the charge transport layer is not particularly limited, and a known forming method is used. For example, a coating film of a coating solution for forming a charge transport layer in which the above-described components are added to a solvent is formed, and the coating film is dried and, as necessary, heated.

Examples of the solvent for preparing the coating solution for forming a charge transport layer include typical organic solvents, for example, aromatic hydrocarbons such as benzene, toluene, xylene, and chlorobenzene; ketones such as acetone and 2-butanone; halogenated aliphatic hydrocarbons such as methylene chloride, chloroform, and ethylene chloride; and cyclic or linear ethers such as tetrahydrofuran and ethyl ether. These solvents are used alone or in the form of a mixture of two or more kinds thereof.

Examples of the coating method of coating the charge generation layer with the coating solution for forming a charge transport layer include typical methods such as a blade coating method, a wire bar coating method, a spray coating method, a dip coating method, a bead coating method, an air knife coating method, and a curtain coating method.

Surface Organic Protective Layer

The surface organic protective layer is provided, for example, for the purpose of preventing a chemical change in the photosensitive layer during charging and further improving the mechanical strength of the photosensitive layer.

Therefore, for example, a layer formed of a cured film (crosslinked film) may be employed as the surface organic protective layer. Examples of these layers include the layers described in the items 1) and 2) below.

1) A layer formed of a cured film of a composition containing a reactive group-containing charge transport material having a reactive group and a charge-transporting skeleton in an identical molecule (that is, a layer containing a polymer or a crosslinked body of the reactive group-containing charge transport material)

2) A layer formed of a cured film of a composition containing a non-reactive charge transport material and a reactive group-containing non-charge transport material containing a reactive group without having a charge-transporting skeleton (that is, a layer containing the non-reactive charge transport material and a polymer or crosslinked body of the reactive group-containing non-charge transport material)

Examples of the reactive group of the reactive group-containing charge transport material include known reactive groups such as a chain polymerizable group, an epoxy group, —OH, —OR [here, R represents an alkyl group], —$NH_2$, —SH, —COOH, and —$SiR^{Q1}{}_{3-Qn}(OR^{Q2})_{Qn}$ [here, $R^{Q1}$ represents a hydrogen atom, an alkyl group, or a substituted or unsubstituted aryl group, $R^{Q2}$ represents a hydrogen atom, an alkyl group, or a trialkylsilyl group, and Qn represents an integer of 1 to 3].

The chain polymerizable group is not particularly limited as long as the group is a functional group capable of radical polymerization and is, for example, a functional group containing a group having at least a carbon double bond. Specific examples thereof include a vinyl group, a vinyl ether group, a vinyl thioether group, a styryl group (vinylphenyl group), an acryloyl group, a methacryloyl group, and a group containing at least one selected from derivatives thereof. Among these, from the viewpoint that the reactivity is excellent, for example, a vinyl group, a styryl group (vinylphenyl group), an acryloyl group, a methacryloyl group, and a group containing at least one selected from derivatives thereof are preferable as the chain polymerizable group.

The charge-transporting skeleton of the reactive group-containing charge transport material is not particularly limited as long as the skeleton is a known structure in the electrophotographic photoreceptor, and examples thereof include a structure conjugated with a nitrogen atom, which is a skeleton derived from a nitrogen-containing positive hole-transporting compound such as a triarylamine-based compound, a benzidine-based compound, or a hydrazone-based compound. Among these, for example, a triarylamine skeleton is preferable.

The reactive group-containing charge transport material having the reactive group and the charge-transporting skeleton, the non-reactive charge transport material, and the reactive group-containing non-charge transport material may be selected from known materials.

The reactive group-containing charge transport material may be a reactive group-containing charge transport material containing a chain polymerizable group as a reactive group (hereinafter, also referred to as "specific reactive group-containing charge transport material (a)"). The reactive group-containing non-charge transport material may be used alone or in combination of two or more kinds thereof.

For example, a compound represented by General Formula (A) is preferable as the specific reactive group-containing charge transport material (a) from the viewpoint that the charge transport properties are excellent.

(A)

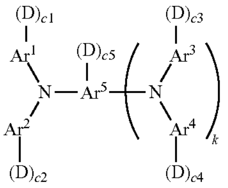

In General Formula (A), $Ar^1$ to $Ar^4$ each independently represent a substituted or unsubstituted aryl group, $Ar^5$ represents a substituted or unsubstituted aryl group or a substituted or unsubstituted arylene group, D represent an organic group containing a chain polymerizable group, c1 to c5 each independently represent an integer of 0 or greater and 2 or less, k represents 0 or 1, d represents an integer of 0 or greater and 5 or less, e represents 0 or 1, and the total number of Ds is 4 or greater.

In General Formula (A), $Ar^1$ to $Ar^4$ each independently represent a substituted or unsubstituted aryl group. $Ar^1$ to $Ar^4$ may be the same as or different from each other.

Here, examples of the substituent in the substituted aryl group include an alkyl group or an alkoxy group having 1 to 4 carbon atoms and a substituted or unsubstituted aryl group having 6 or more and 10 or less carbon atoms in addition to the organic group containing a chain polymerizable group as D.

It is preferable that $Ar^1$ to $Ar^4$ are represented by, for example, any of Formulae (1) to (7). Further, Formulae (1) to (7) show "-$(D)_C$" generally representing "-$(D)_{C1}$" to "-$(D)_{C4}$" that can be linked to each of $Ar^1$ to $Ar^4$.

(1)

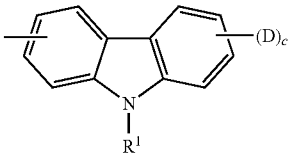

(2)

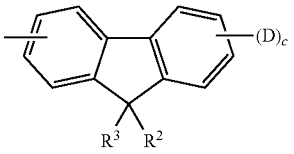

(3)

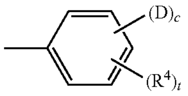

(4)

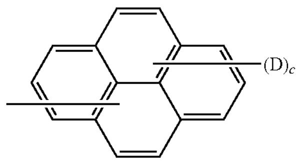

(5)

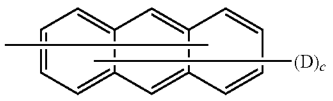

(6)

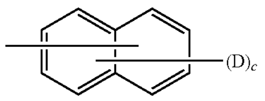

(7)

$$—Ar—(Z')_s—Ar—(D)_c$$

In Formulae (1) to (7), $R^1$ represents one selected from the group consisting of a hydrogen atom, an alkyl group having 1 or more and 4 or less carbon atoms, a phenyl group substituted with an alkyl group having 1 or more and 4 or less carbon atoms or an alkoxy group having 1 or more and 4 or less carbon atoms, an unsubstituted phenyl group, and an aralkyl group having 7 or more and 10 or less carbon atoms, $R^2$ to $R^4$ each independently represent one selected from the group consisting of a hydrogen atom, an alkyl group having 1 or more and 4 or less carbon atoms, an alkoxy group having 1 or more and 4 or less carbon atoms, a phenyl group substituted with an alkoxy group having 1 or more and 4 or less carbon atoms, an unsubstituted phenyl group, an aralkyl group having 7 or more and 10 or less carbon atoms, and a halogen atom. Ar represents a substituted or unsubstituted arylene group, D represents an organic group containing a chain polymerizable group, c represents 1 or 2, s represents 0 or 1, and t represents an integer of 0 or greater and 3 or less.

Here, it is preferable that Ar in Formula (7) is represented by, for example, Structural Formula (8) or (9).

(8)

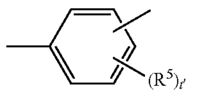

(9)

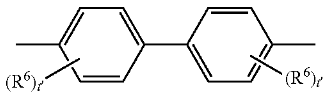

In Formulae (8) and (9), $R^5$ and $R^6$ each independently represent one selected from the group consisting of a hydrogen atom, an alkyl group having 1 or more and 4 or less carbon atoms, an alkoxy group having 1 or more and 4 or less carbon atoms, a phenyl group substituted with an alkoxy group having 1 or more and 4 or less carbon atoms, an unsubstituted phenyl group, an aralkyl group having 7 or more and 10 or less carbon atoms, and a halogen atom, and each t' independently represents an integer of 0 or greater and 3 or less.

Further, in Formula (7), Z' represents a divalent organic linking group and, for example, preferably a group represented by any of Formulae (10) to (17). Further, in Formula (7), each s independently represents 0 or 1.

(10)

$$-(CH_2)_q-$$

(11)

$$-(CH_2CH_2O)_r-$$

(12)

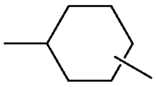

(13)

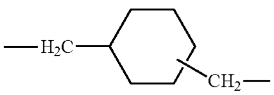

(14)

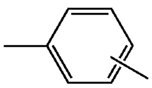

(15)

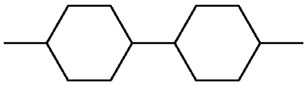

(16)

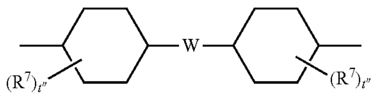

-continued (17)

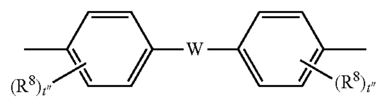

In Formulae (10) to (17), $R^7$ and $R^8$ each independently represent one selected from the group consisting of a hydrogen atom, an alkyl group having 1 or more and 4 or less carbon atoms, an alkoxy group having 1 or more and 4 or less carbon atoms, a phenyl group substituted with an alkoxy group having 1 or more and 4 or less carbon atoms, an unsubstituted phenyl group, an aralkyl group having 7 or more and 10 or less carbon atoms, and a halogen atom, W represents a divalent group, q and r each independently represent an integer of 1 or greater and 10 or less, and each t'' independently represents an integer of 0 or greater and 3 or less.

It is preferable that W in Formulae (16) to (17) is, for example, represented by any of the divalent groups represented by Formulae (18) to (26). Here, in Formula (25), u represents an integer of 0 or greater and 3 or less.

(18)

$$-CH_2-$$

(19)

$$-C(CH_3)_2-$$

(20)

$$-O-$$

(21)

$$-S-$$

(22)

$$-C(CF_3)_2-$$

(23)

$$-Si(CH_3)_2-$$

(24)

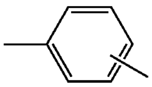

(25)

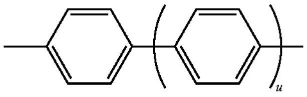

(26)

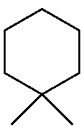

Further, in General Formula (A), $Ar^5$ represents a substituted or unsubstituted aryl group in a case where k represents 0, and examples of the aryl group include the same groups as the groups for the aryl group exemplified in the description of $Ar^1$ to $Ar^4$. Further, $Ar^5$ represents a substituted or unsubstituted arylene group in a case where k represents 1, and examples of the arylene group include an arylene group obtained by removing one hydrogen atom at a position where $—N(Ar^3-(D)_{C3})(Ar^4-(D)_{C4})$ is substituted from the aryl group exemplified in the description of $Ar^1$ to $Ar^4$.

The content of the reactive group-containing charge transport material is, for example, preferably 30% by mass or greater and 100% by mass or less, more preferably 40% by mass or greater and 100% by mass or less, and still more preferably 50% by mass or greater and 100% by mass or less with respect to the composition (solid content) used for forming the surface organic protective layer. In a case where the content thereof is set to be in the above-described ranges, the electrical properties of the cured film are excellent, and the cured film can be thickened.

Examples of the non-reactive charge transport material include electron-transporting compounds, for example, a quinone-based compound such as p-benzoquinone, chloranil, bromanil, or anthraquinone; a tetracyanoquinodimethane-based compound; a fluorenone compound such as 2,4,7-trinitrofluorenone; a xanthone-based compound; a benzophenone-based compound; a cyanovinyl-based compound; and an ethylene-based compound. Examples of the charge transport material include a positive hole-transporting compound such as a triarylamine-based compound, a benzidine-based compound, an arylalkane-based compound, an aryl-substituted ethylene-based compound, a stilbene-based compound, an anthracene-based compound, or a hydrazone-based compound. The non-reactive charge transport material may be used alone or in combination of two or more kinds thereof.

Examples of the reactive group-containing non-charge transport material include a thermosetting resin and a curing agent. The reactive group-containing non-charge transport material may be used alone or in combination of two or more kinds thereof.

Examples of the thermosetting resin include a guanamine resin, a melamine resin, a phenol resin, a urea resin, and an alkyd resin.

Examples of the curing agent include a compound having a guanamine structure (hereinafter, also referred to as "guanamine compound") and a compound having a melamine structure (hereinafter, also referred to as "melamine compound").

In a case where the surface organic protective layer is, for example, a cured film formed to contain at least one crosslinked body (crosslinked material) selected from a reactive group-containing charge transport material, a thermosetting resin (for example, more preferably a guanamine resin or a melamine resin), a guanamine compound, or a melamine compound, a cured film with a high cure degree is likely to be obtained and the abrasion resistance is more excellent as compared with a case where the surface organic protective layer does not contain a thermosetting resin (for example, more preferably a guanamine resin or a melamine resin), a guanamine compound, and a melamine compound.

Among the layers described in 1) and 2) above, it is preferable that the surface organic protective layer is, for example, 1) the layer formed of a cured material of a composition containing a reactive group-containing charge transport material having a reactive group and a charge-transporting skeleton in an identical molecule. In a case where the surface organic protective layer is the layer described in 1) above, the hardness of the surface organic protective layer is likely to further increase and the abrasion resistance tends to be excellent as compared with a case where the surface organic protective layer is the layer described in 2) above.

Fluororesin Particles

The surface organic protective layer may further contain fluororesin particles.

In a case where the surface organic protective layer contains fluororesin particles, the outer peripheral surface of the surface organic protective layer is roughened as appropriate, and the abrasion resistance is more excellent.

The content of the fluororesin particles in the surface organic protective layer is 5% by mass or greater and 15% by mass or less with respect to the total solid content of the surface organic protective layer.

The content of the fluororesin particles is, for example, desirably 5% by mass or greater and 15% by mass or less and more desirably 7% by mass or greater and 12% by mass or less with respect to all the components constituting the layer (the total amount of the solid content).

The fluororesin particles are not particularly limited, and examples thereof include particles such as polytetrafluoroethylene (PTFE, also referred to as "tetrafluoroethylene resin"), a perfluoroalkoxy fluororesin, polychlorotrifluoroethylene, polyvinylidene fluoride, polydichlorodifluoroethylene, a tetrafluoroethylene-perfluoroalkyl vinyl ether copolymer, a tetrafluoroethylene-hexafluoropropylene copolymer, a tetrafluoroethylene-ethylene copolymer, a tetrafluoroethylene-hexafluoropropylene-perfluoroalkyl vinyl ether copolymer, and a tetrafluoroethylene-perfluoroalkoxy ethylene copolymer.

Among these, from the viewpoints of the abrasion resistance and the cleaning properties of the electrophotographic photoreceptor, for example, polytetrafluoroethylene and a copolymer of tetrafluoroethylene and perfluoroalkoxyethylene are desirable.

The fluororesin particles may be used alone or in combination of two or more kinds thereof.

The weight-average molecular weight of the fluororesin constituting the fluororesin particles may be, for example, 3,000 or greater and 5,000,000 or less.

The average primary particle diameter of the fluororesin particles is, for example, desirably 0.05 μm or greater and 10 μm or less and more desirably 0.1 μm or greater and 5 μm or less.

Further, the average primary particle diameter of the fluororesin particles denotes a value obtained by measuring a measurement liquid at a refractive index of 1.35 which has been diluted with the same solvent as the solvent for a dispersion liquid in which fluororesin particles are dispersed, using a laser diffraction/scattering type particle size distribution measuring device LA-920 (manufactured by Horiba, Ltd.).

Examples of commercially available products of the fluororesin particles include LUBRON (registered trademark) series (manufactured by Daikin Industries, Ltd.), TEFLON (registered trademark) series (manufactured by DuPont), and DYNION series (manufactured by Sumitomo 3M Ltd.).

The surface organic protective layer may also contain other known additives.

The formation of the surface organic protective layer is not particularly limited, and a known forming method is used. For example, a coating film of a coating solution for forming a surface organic protective layer in which the above-described components are added to a solvent is formed, and the coating film is dried and, as necessary, subjected to a curing treatment such as heating.

Examples of the solvent for preparing the coating solution for forming a surface organic protective layer include an aromatic solvent such as toluene or xylene; a ketone-based solvent such as methyl ethyl ketone, methyl isobutyl ketone, or cyclohexanone; an ester-based solvent such as ethyl acetate or butyl acetate; an ether-based solvent such as tetrahydrofuran or dioxane; a cellosolve-based solvent such as ethylene glycol monomethyl ether; and an alcohol-based solvent such as isopropyl alcohol or butanol. These solvents are used alone or in the form of a mixture of two or more kinds thereof.

In addition, the coating solution for forming a surface organic protective layer may be a solvent-less coating solution.

Examples of the method of coating the photosensitive layer (for example, the charge transport layer) with the coating solution for forming a surface organic protective layer include typical coating methods such as a dip coating method, a push-up coating method, a wire bar coating method, a spray coating method, a blade coating method, an air knife coating method, and a curtain coating method.

The film thickness of the protective layer is set to be, for example, preferably in a range of 1 μm or greater and 20 μm or less and more preferably in a range of 2 μm or greater and 10 μm or less.

Image Forming Apparatus and Process Cartridge

An image forming apparatus according to the present exemplary embodiment includes the photoreceptor, a charging device that charges a surface of the photoreceptor, an electrostatic charge image forming device that forms an electrostatic charge image on the charged surface of the photoreceptor, a developing device that develops the electrostatic charge image formed on the surface of the electrophotographic photoreceptor with a developer containing a toner to form a toner image, and a transfer device that transfers the toner image to a surface of a recording medium.

Here, as the image forming apparatus according to the present exemplary embodiment, a known image forming apparatus such as an apparatus including a direct transfer type apparatus that transfers the toner image formed on the surface of the photoreceptor directly to the recording medium, an intermediate transfer type apparatus that primarily transfers the toner image formed on the surface of the photoreceptor to the surface of the intermediate transfer member and secondarily transfers the toner image transferred to the surface of the intermediate transfer member to the surface of the recording medium, or an apparatus including a charge erasing device that irradiates the surface of the photoreceptor with charge erasing light after the transfer of the toner image and before the charging to erase the charges on the surface is employed.

In a case of the intermediate transfer type apparatus, the transfer device is, for example, configured to include an intermediate transfer member having a surface onto which the toner image is transferred, a primary transfer device primarily transferring the toner image formed on the surface of the photoreceptor to the surface of the intermediate transfer member, and a secondary transfer device secondarily transferring the toner image transferred to the surface of the intermediate transfer member to the surface of the recording medium.

The image forming apparatus according to the present exemplary embodiment may be any of a dry development type image forming apparatus or a wet development type (development type using a liquid developer) image forming apparatus.

Further, in the image forming apparatus according to the present exemplary embodiment, for example, the portion including the photoreceptor may have a cartridge structure (process cartridge) that is attachable to and detachable from the image forming apparatus. As the process cartridge, for example, a process cartridge including the photoreceptor according to the present exemplary embodiment is preferably used. Further, the process cartridge may include, for example, at least one selected from the group consisting of a charging device, an electrostatic charge image forming device, a developing device, and a transfer device in addition to the electrophotographic photoreceptor.

Hereinafter, an example of the image forming apparatus according to the present exemplary embodiment will be described, but the present exemplary embodiment is not limited thereto. Further, main parts shown in the FIGURES will be described, but description of other parts will not be provided.

FIG. 1 is a schematic configuration view showing an example of the image forming apparatus according to the present exemplary embodiment.

As shown in FIG. 1, an image forming apparatus 10 according to the present exemplary embodiment is provided with, for example, a photoreceptor 12. The photoreceptor 12 has a columnar shape, is connected to a driving unit 27 such as a motor via a drive force transmission member (not shown) such as a gear, and is rotationally driven by the driving unit 27 around a rotation axis indicated by a black spot. In the example shown in FIG. 1, the photoreceptor 12 is rotationally driven in a direction indicated by an arrow A'.

In the periphery of the photoreceptor 12, for example, a charging device 15, an electrostatic charge image forming device 16 (an example of the electrostatic charge image forming device), a developing device 18 (an example of the developing device), a transfer device 31 (an example of the transfer device), and a cleaning device 22 (an example of the cleaning device) are disposed in order in the rotation direction of the photoreceptor 12. Further, the image forming apparatus 10 is also provided with a fixing device 26 including a fixing member 26A and a pressure member 26B disposed in contact with the fixing member 26A. Further, the image forming apparatus 10 includes a control device 36 that controls the operation of each device (each unit). Further, a unit including the photoreceptor 12, the charging device 15, the electrostatic charge image forming device 16, the developing device 18, the transfer device 31, and the cleaning device 22 corresponds to an image forming unit.

The image forming apparatus 10 may include at least the photoreceptor 12 as a process cartridge integrated with other devices.

Hereinafter, each device (each part) of the image forming apparatus 10 will be described in detail.

Photoreceptor

The photoreceptor according to the present exemplary embodiment is employed as the photoreceptor 12.

Charging Device

The charging device 15 charges the surface of the photoreceptor 12. The charging device 15 is provided, for example, on the surface of the photoreceptor 12 in a contact or non-contact manner and includes a charging member 14 that charges the surface of the photoreceptor 12 and a power supply 28 (an example of a voltage applying unit for the charging member) that applies a charging voltage to the charging member 14. The power supply 28 is electrically connected to the charging member 14.

Examples of the charging member 14 of the charging device 15 include a contact type charger using a conductive charging roller, a charging brush, a charging film, a charging rubber blade, a charging tube, or the like. Further, examples of the charging member 14 also include a known charger such as a non-contact type roller charger, or a scorotron charger or a corotron charger using corona discharge.

Electrostatic Charge Image Forming Device

The electrostatic charge image forming device 16 forms an electrostatic charge image on the surface of the charged photoreceptor 12. Specifically, for example, the electrostatic charge image forming device 16 irradiates the surface of the photoreceptor 12 charged by the charging member 14 with light L modulated based on image information of an image to be formed so that an electrostatic charge image according to the image of image information is formed on the photoreceptor 12.

Examples of the electrostatic charge image forming device 16 include an optical system device that includes a light source imagewise-exposing the surface of the electrophotographic photoreceptor to light such as a semiconductor laser beam, LED light, or liquid crystal shutter light.

Developing Device

The developing device 18 is provided, for example, on the downstream side of the photoreceptor 12 in a rotation direction with respect to an irradiation position of the light L using the electrostatic charge image forming device 16. An accommodating portion that accommodates a developer is provided in the developing device 18. An electrostatic charge image developer having a toner is accommodated in this accommodating portion. The toner is accommodated, for example, in a charged state in the developing device 18.

Further, in the image forming apparatus shown in FIG. 1, particles of a fatty acid metal salt are added to the developer (toner thereof) accommodated in the developing device 18, that is, the developing device 18 also serves as a supply device that supplies the fatty acid metal salt to a contact portion between the surface of the photoreceptor 12 and a cleaning blade 22A.

Further, the particles of the fatty acid metal salt added to the developer (the toner thereof) will be described below in detail.

The developing device 18 includes, for example, a developing member 18A that develops the electrostatic charge image formed on the surface of the photoreceptor 12 with a developer containing a toner and a power supply 32 that applies a developing voltage to the developing member 18A. The developing member 18A is electrically connected to, for example, the power supply 32.

The developing member 18A of the developing device 18 is selected depending on the kind of developer, and examples thereof include a developing roll having a developing sleeve with a built-in magnet.

The developing device 18 (including the power supply 32) is, for example, electrically connected to the control device 36 provided in the image forming apparatus 10, is driven and controlled by the control device 36, and applies a developing voltage to the developing member 18A. The developing member 18A to which the developing voltage has been applied is charged with a developing potential according to the developing voltage. Further, the developing member 18A charged with the developing potential, for example, holds the developer accommodated in the developing device 18 on the surface and supplies the toner contained in the developer to the surface of the photoreceptor 12 from the inside of the developing device 18. The formed electrostatic charge image is developed as a toner image on the surface of the photoreceptor 12 to which the toner has been supplied.

Transfer Device

The transfer device 31 is provided, for example, on the downstream side of the photoreceptor 12 in the rotation direction with respect to the position where the developing member 18A is disposed. The transfer device 31 includes, for example, a transfer member 20 that transfers a toner image formed on the surface of the photoreceptor 12 to a recording medium 30A and a power supply 30 that applies a transfer voltage to the transfer member 20. The transfer member 20 has, for example, a columnar shape and transports the recording medium 30A in a state of sandwiching the recording medium 30A between the photoreceptor 12 and the transfer member 20. The transfer member 20 is, for example, electrically connected to the power supply 30.

Examples of the transfer member 20 include a contact type transfer charger using a belt, a roller, a film, or a rubber cleaning blade and a known non-contact type transfer charger such as a scorotron transfer charger or a corotron transfer charger using corona discharge.

The transfer device 31 (including the power supply 30) is, for example, electrically connected to the control device 36 provided in the image forming apparatus 10, is driven and controlled by the control device 36, and applies a transfer voltage to the transfer member 20. The transfer member 20 to which the transfer voltage has been applied is charged with a transfer potential according to the transfer voltage.

In a case where a transfer voltage having a polarity opposite to the polarity of the toner constituting the toner image formed on the photoreceptor 12 is applied to the transfer member 20 from the power supply 30 of the transfer member 20, a transfer electric field with an electric field intensity for moving each toner constituting the toner image on the photoreceptor 12 to the transfer member 20 side from the photoreceptor 12 using an electrostatic force is formed, for example, in a region where the photoreceptor 12 and the transfer member 20 face each other (see a transfer region 32A in FIG. 1).

The recording medium 30A is, for example, accommodated in an accommodating portion (not shown), is transported from the accommodating portion along a transport path 34 by a plurality of transporting members (not shown), and reaches the transfer region 32A, which is the region where the photoreceptor 12 and the transfer member 20 face each other. In the example shown in FIG. 1, the recording medium 30A is transported in a direction indicated by an arrow B'. In the recording medium 30A that has reached the transfer region 32A, for example, the toner image on the photoreceptor 12 is transferred by the transfer electric field formed in the region by application of the transfer voltage to the transfer member 20. That is, for example, the toner image is transferred onto the recording medium 30A by the movement of the toner from the surface of the photoreceptor 12 to the recording medium 30A. Further, the toner image on the photoreceptor 12 is transferred onto the recording medium 30A by the transfer electric field.

Cleaning Device

The cleaning device 22 is provided on the downstream side of the photoreceptor 12 in the rotation direction with respect to the transfer region 32A. The cleaning device 22 cleans the residual toner adhered to the photoreceptor 12 after the toner image is transferred to the recording medium 30A. The cleaning device 22 cleans an adhesive material such as paper dust in addition to the residual toner.

The cleaning device 22 includes the cleaning blade 22A and brings the tip of the cleaning blade 22A into contact with the photoreceptor 12 in a direction facing the rotation direction to remove the adhesive material on the surface of the photoreceptor 12.

Fixing Device

The fixing device 26 is provided, for example, on a downstream side of the transport path 34 of the recording medium 30A in the transport direction with respect to the transfer region 32A. The fixing device 26 has a fixing member 26A and a pressure member 26B disposed in contact with the fixing member 26A and fixes the toner image transferred onto the recording medium 30A at a contact portion between the fixing member 26A and the pressure member 26B. Specifically, for example, the fixing device 26 is electrically connected to the control device 36 provided in the image forming apparatus 10, is driven and controlled by the control device 36, and fixes the toner image transferred onto the recording medium 30A to the recording medium 30A by heat and a pressure.

Examples of the fixing device 26 include a fixing machine known per se, such as, a thermal roller fixing machine or an oven fixing machine.

Specifically, for example, a known fixing device including a fixing roll or a fixing belt as the fixing member 26A and a pressure roll or a pressure belt as the pressure member 26B is employed as the fixing device 26.

Here, the recording medium 30A transported along the transport path 34 and to which the toner image is transferred by passing through a region (transfer region 32A) where the photoreceptor 12 and the transfer member 20 face each other reaches, for example, the installation position of the fixing device 26 along the transport path 34 by the transporting member (not shown) so that the toner image is fixed onto the recording medium 30A.

The recording medium 30A in which the image is formed by fixing the toner image is discharged to the outside of the image forming apparatus 10 by a plurality of transporting members (not shown).

Operation of Image Forming Apparatus

An example of the operation of the image forming apparatus 10 according to the present exemplary embodiment will be described. Further, various operations of the image forming apparatus 10 are performed by a control program executed by the control device 36.

The image forming operation of the image forming apparatus 10 will be described.

First, the surface of the photoreceptor 12 is charged by the charging device 15. The electrostatic charge image forming device 16 exposes the surface of the charged photoreceptor 12 based on the image information. In this manner, an electrostatic charge image according to the image information is formed on the photoreceptor 12. In the developing device 18, the electrostatic charge image formed on the surface of the photoreceptor 12 is developed by a developer containing a toner. In this manner, a toner image is formed on the surface of the photoreceptor 12. Further, particles of the fatty acid metal salt are added to the developer (toner thereof) accommodated in the developing device 18, and particles of the fatty acid metal salt are also supplied to the surface of the photoreceptor 12 together with the toner.

In the transfer device 31, the toner image formed on the surface of the photoreceptor 12 is transferred to the recording medium 30A. The toner image transferred to the recording medium 30A is fixed by the fixing device 26.

Meanwhile, the surface of the photoreceptor 12 after the toner image has been transferred is cleaned by the cleaning blade 22A in the cleaning device 22. In addition, a part of the particles of the fatty acid metal salt supplied to the surface of the photoreceptor 12 in the developing device 18 remains on the surface of the photoreceptor 12 even after the toner image is transferred by the transfer device 31, and is supplied to a position where the cleaning blade 22A and the photoreceptor 12 are in contact with each other.

Therefore, high cleaning performance is exhibited by the cleaning blade 22A due to the presence of the fatty acid metal salt at the position where the cleaning blade 22A and the photoreceptor 12 are in contact with each other.

EXAMPLES

Hereinafter, the present invention will be described in more detail with reference to examples and comparative examples, but the present invention is not limited to such examples.

Example 1

Formation of Undercoat Layer 100 parts by mass of zinc oxide (average particle diameter of 70 nm: manufactured by Tayca Corporation: specific surface area value of 15 $m^2/g$) and 500 parts by mass of toluene are stirred and mixed, and 1.3 parts by mass of a silane coupling agent (KBM503: manufactured by Shin-Etsu Chemical Co., Ltd.) is added thereto, and the mixture is stirred for 2 hours. Thereafter, toluene is distilled off by vacuum distillation and baked at 120° C. for 3 hours to obtain zinc oxide surface-treated with a silane coupling agent. 110 parts by mass of the surface-treated zinc oxide is stirred and mixed with 500 parts by mass of tetrahydrofuran, a solution in which 0.6 parts by mass of alizarin is dissolved in 50 parts by mass of tetrahydrofuran is added thereto, and the mixture is stirred at 50° C. for 5 hours. Thereafter, zinc oxide to which alizarin is added is filtered off by vacuum filtration, and further dried under reduced pressure at 60° C. to obtain zinc oxide to which alizarin is added. 38 parts by mass of a liquid obtained by mixing 60 parts by mass of zinc oxide to which this alizarin is added, 13.5 parts by mass of a curing agent (blocked isocyanate, DESMODUR 3175, manufactured by Sumitomo Covestro Urethane Co., Ltd.), 15 parts by mass of a butyral resin (S-LEC BM-1, manufactured by Sekisui Chemical Co., Ltd.) in 85 parts by mass of methyl ethyl ketone and 25 parts by mass of methyl ethyl ketone are mixed and dispersed by a sand mill for 2 hours using glass beads having a diameter of 1 mmφ, thereby obtaining a dispersion liquid. 0.005 parts by mass of dioctyltin dilaurate and 40 parts by mass of silicone resin particles (Tospearl 145, manufactured by Momentive Performance Materials) are added to the obtained dispersion liquid as a catalyst, thereby obtaining a coating solution for forming an undercoat layer. An aluminum conductive substrate having a thickness listed in Table 1 is coated with the coating solution for forming an undercoat layer using a dip coating method, dried, and cured at 170° C. for 40 minutes, thereby obtaining an undercoat layer having a thickness of 18 μm.

Formation of Charge Generation Layer

Hydroxygallium phthalocyanine having diffraction peaks at least at positions where Bragg angles (2θ+0.2°) of the X-ray diffraction spectrum using Cukα characteristic X-ray are 7.5°, 16.3°, 25.0°, and 28.3° is prepared as the charge generation material. A mixture obtained by mixing 15 parts by mass of the hydroxygallium phthalocyanine, 10 parts by mass of a vinyl chloride-vinyl acetate copolymer resin (VMCH, Nippon Unicar Company Limited), and 200 parts by mass of n-butyl acetate is dispersed in a sand mill using glass beads having a diameter of 1 mm for 4 hours. 175 parts by mass of n-butyl acetate and 180 parts by mass of methyl ethyl ketone are added to the dispersion liquid, and the mixture is stirred, thereby obtaining a coating solution for forming a charge generation layer. The undercoat layer is immersed in and coated with the coating solution and dried at 150° C. for 10 minutes, thereby forming a charge generation layer having a thickness of 0.2 μm.

Formation of Charge Transport Layer 38 parts by mass of a charge transport agent (HT-1), 10 parts by mass of a charge transport agent (HT-2), and 52 parts by mass of a polycarbonate (A) (viscosity average molecular weight of 48,000) are added to 800 parts by mass of tetrahydrofuran and dissolved therein, thereby obtaining a coating solution for forming a charge transport layer. The charge generation layer is immersed in and coated with the coating solution and dried at 140° C. for 40 minutes, thereby forming a charge transport layer having a thickness of 11 μm.

(HT-1)

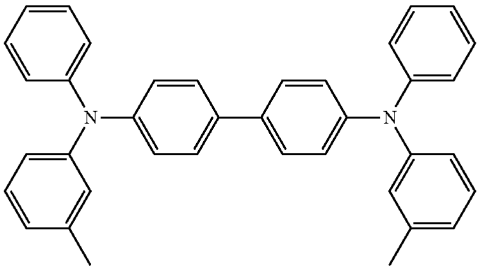

Charge transport agent (HT-2)

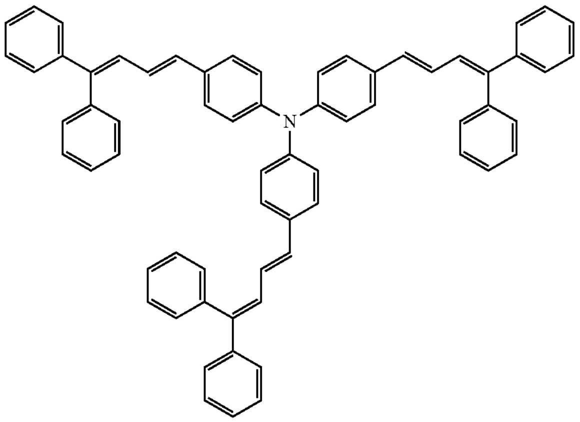

Charge transport agent (A)

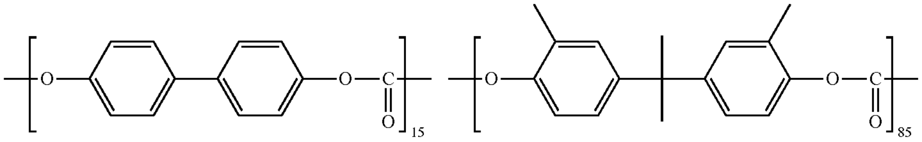

Polycarbonate

Formation of Surface Organic Protective Layer

A surface organic protective layer formed of a thermosetting film with a composition containing a reactive group-containing charge transport material that contains a reactive group and a charge-transporting skeleton in an identical molecule is formed as follows.

70 parts by mass of a compound (2) represented by the following structural formula that is a reactive group-containing charge transport material, 15 parts by mass of a compound (3) represented by the following structural formula that is a reactive group-containing charge transport material, and 4.4 parts by mass of a curable resin that is a reactive group-containing non-charge transport material (benzoguanamine resin, NIKALAC BL-60, manufactured by Sanwa Chemical Co., Ltd.; (H)-17 described above) are added to 220 parts by mass of 2-propanol, mixed, and dissolved therein, and 0.1 parts by mass of NACURE5225 (manufactured by King Industries, Inc.) is added thereto as a curing catalyst, thereby obtaining a coating solution for forming a surface organic protective laver.

The charge transport layer is immersed in and coated with the coating solution for forming a surface organic protective layer, air-dried at room temperature (25° C.) for 30 minutes, heated at an oxygen concentration of 110 ppm from room temperature to the heating temperature (reaching temperature) listed in Table 1 in a nitrogen stream, held for the heating time (holding time) listed in Table 1, subjected to a heat treatment, and cured. In this manner, a surface organic protective layer having a film thickness of 7 μm is formed.

Compound (2)

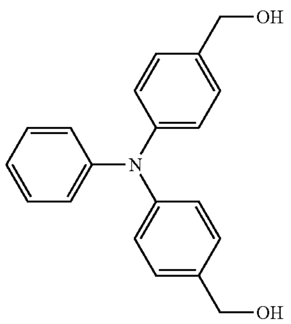

-continued

Compound (3)

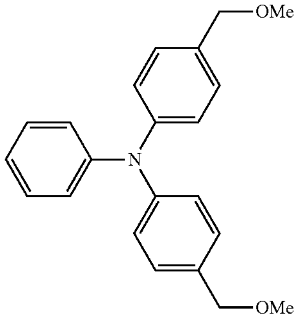

A photoreceptor is obtained by performing the above-described steps.

Examples 2 to 12 and Comparative Example 1

Each photoreceptor of each example is obtained in the same manner as in Example 1 except that the thicknesses of the undercoat layer and the charge transport layer are changed as listed in Table 2.

Measurement of Young's Modulus of Charge Transport Layer

The Young's modulus of the charge transport layer of the photoreceptor of each example is measured by the method described above.

Evaluation

The photoreceptor of each example is mounted in an image forming apparatus (DocuCentre-V C2263, manufactured by FUJIFILM Business Innovation Corp.). Further, the DC voltage applied to the charging roll in the image forming apparatus is set to −900 V (voltage at which the surface potential of the photoreceptor reaches 400 V in terms of the absolute value).

The following evaluation is performed using the image forming apparatus.

Evaluation of Defects of Surface Organic Protective Layer 700,000 sheets of halftone images with a density of 30% are output onto A4 paper. Thereafter, the photoreceptor is taken out from the apparatus, and the peeling degree of the surface organic protective layer is evaluated. The evaluation standards are as follows.

A: The layer is not peeled.

B: The layer appears to be peeled off (peeling of less than 30 μm), which is at an acceptable level in practical use.

C: Peeling defects (peeling of 30 μm or greater and 100 μm or less) are found, which are at an unacceptable level in practical use.

D: Peeling defects (peeling of 100 μm or greater) are found, which are at an unacceptable level in practical use.

Evaluation of Current Leak (That Is, Current Leakage)

The current leakage is evaluated as follows.

A charging voltage of 1.5 kV is applied to a charging roll of a process cartridge, and it is confirmed whether or not a leak (the current is discharged from one point of the photosensitive layer and a pinhole is formed) has occurred in the photoreceptor 30 minutes after the application. The evaluation standards are as follows.

A: The current leak is not found.

B: The current leak is found.

Evaluation of carbon fiber leak (that is, current leakage due to sticking of needle-like foreign matter)

The carbon fiber leak is evaluated as follows.

Carbon fibers (average diameter of 7 m, average length of 50 μm) are mixed with a developer in an amount set such that the concentration reaches 0.1% by mass, and 20,000 sheets of images with a density of 20% are continuously output onto A4 paper. Next, 10 sheets of images having a density of 20% are output on A4 paper. The presence or absence of spot-like image defects in the 10th image is visually observed, and the degree of image defects is classified into A to C described below. The evaluation standards are as follows.

A: Spot-like image defects are not found.

B: The number of spot-like image defects is less than 15, which is at an acceptable level in practical use.

C: The number of spot-like image defects is more than 15, which is at an unacceptable level in practical use.

TABLE 1

| | Thickness of each layer | | Ratio of thickness of charge transport layer to thickness | Total thickness of charge transport layer | Young's modulus of charge | Peeling of surface | | |
|---|---|---|---|---|---|---|---|---|
| | Undercoat layer | Charge transport layer | of undercoat layer — | and undercoat layer μm | transport layer MPa | organic protective layer | Current leak | Carbon fiber leak |
| Example 1 | 18 | 11 | 0.6 | 29.0 | 6800 | A | A | B |
| Example 2 | 19 | 8 | 0.4 | 27.0 | 6800 | A | B | B |
| Example 3 | 19 | 11 | 0.6 | 30.0 | 6700 | A | A | A |
| Example 4 | 19 | 18 | 0.9 | 37.0 | 5900 | A | A | A |
| Comparative Example 1 | 19 | 22 | 1.2 | 41.0 | 5400 | D | A | C |
| Example 5 | 21 | 11 | 0.5 | 32.0 | 6600 | A | A | A |
| Example 6 | 24 | 11 | 0.5 | 35.0 | 6300 | A | A | A |
| Example 7 | 25 | 11 | 0.4 | 36.0 | 6200 | A | A | A |
| Example 8 | 25 | 18 | 0.7 | 43.0 | 5500 | B | A | A |
| Example 9 | 26 | 11 | 0.4 | 37.0 | 6000 | A | A | A |
| Example 10 | 30 | 11 | 0.4 | 41.0 | 5700 | A | A | A |
| Example 11 | 31 | 11 | 0.4 | 42.0 | 5600 | A | A | A |

TABLE 1-continued

| | Thickness of each layer | | Ratio of thickness of charge transport layer to thickness of undercoat layer | Total thickness of charge transport layer and undercoat layer | Young's modulus of charge transport layer | Peeling of surface organic protective layer | | |
|---|---|---|---|---|---|---|---|---|
| | Undercoat layer | Charge transport layer | — | μm | MPa | | Current leak | Carbon fiber leak |
| Example 12 | 32 | 9 | 0.3 | 41.0 | 5700 | A | A | A |
| Example 13 | 32 | 11 | 0.3 | 43.0 | 5500 | A | A | A |
| Comparative Example 2 | 32 | 18 | 0.6 | 50.0 | 4800 | C | A | A |

As shown in the results described above, it may be seen that defects of the surface organic protective layer are suppressed in the present examples as compared with the comparative examples.

Further, in the present examples, in a case where the thicknesses of the undercoat layer and the charge transport layer are controlled to be in appropriate ranges, current leak (that is, current leakage) and carbon fiber leak (that is, current leakage due to sticking of needle-like foreign matter) are also suppressed.

The present exemplary embodiment includes the following aspects.

(((1)))

An electrophotographic photoreceptor comprising:

a conductive substrate;

an undercoat layer provided on the conductive substrate;

a charge generation layer provided on the undercoat layer;

a charge transport layer provided on the charge generation layer; and a surface organic protective layer provided on the charge transport layer, wherein the charge transport layer has a Young's modulus of 5,500 MPa or greater.

(((2)))

The electrophotographic photoreceptor according to (((1))), wherein the charge transport layer has a Young's modulus of 5,800 MPa or greater.

(((3)))

The electrophotographic photoreceptor according to (((1))) or (((2))), wherein the charge transport layer has a thickness of 9 μm or greater and 18 μm or less.

(((4)))

The electrophotographic photoreceptor according to (((3))), wherein the charge transport layer has a thickness of 9 μm or greater and 15 μm or less.

(((5)))

The electrophotographic photoreceptor according to any one of (((1))) to (((4))), wherein the undercoat layer has a thickness of 19 μm or greater and 31 μm or less.

(((6)))

The electrophotographic photoreceptor according to (((5))), wherein the undercoat layer has a thickness of 19 μm or greater and 24 μm or less.

(((7)))

The electrophotographic photoreceptor according to any one of (((1))) to (((6))), wherein a ratio of a thickness of the charge transport layer to a thickness of the undercoat layer (the thickness of the charge transport layer/the thickness of the undercoat layer) is $\frac{9}{31}$ or greater and $\frac{18}{19}$ or less.

(((8)))

The electrophotographic photoreceptor according to (((7))), wherein the ratio of the thickness of the charge transport layer to the thickness of the undercoat layer (the thickness of the charge transport layer/the thickness of the undercoat layer) is $\frac{9}{24}$ or greater and $\frac{15}{19}$ or less.

(((9)))

The electrophotographic photoreceptor according to any one of (((1))) to (((8))), wherein the surface organic protective layer has a thickness of 9 μm or greater and 15 μm or less, the charge transport layer has a thickness of 19 μm or greater and 24 μm or less, and a ratio of a thickness of the charge transport layer to a thickness of the surface organic protective layer (the thickness of the charge transport layer/the thickness of the surface organic protective layer) is $\frac{9}{24}$ or greater and $\frac{15}{19}$ or less.

(((10)))

A process cartridge comprising:

the electrophotographic photoreceptor according to any one of (((1))) to (((9))), wherein the process cartridge is attachable to and detachable from an image forming apparatus.

(((11)))

An image forming apparatus comprising:

the electrophotographic photoreceptor according to any one of (((1))) to (((9)));

a charging device that charges a surface of the electrophotographic photoreceptor;

an electrostatic charge image forming device that forms an electrostatic charge image on the charged surface of the electrophotographic photoreceptor;

a developing device that develops the electrostatic charge image formed on the surface of the electrophotographic photoreceptor with a developer containing a toner to form a toner image; and a transfer device that transfers the toner image to a surface of a recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electrophotographic photoreceptor comprising:

a conductive substrate;

an undercoat layer provided on the conductive substrate;

a charge generation layer provided on the undercoat layer;

a charge transport layer provided on the charge generation layer; and a surface organic protective layer provided on the charge transport layer, wherein the charge transport layer has a Young's modulus of 5,500 MPa or greater.

2. The electrophotographic photoreceptor according to claim 1, wherein the charge transport layer has a Young's modulus of 5,800 MPa or greater.

3. A process cartridge comprising:

the electrophotographic photoreceptor according to claim 2, wherein the process cartridge is attachable to and detachable from an image forming apparatus.

4. An image forming apparatus comprising:

the electrophotographic photoreceptor according to claim 2;

a charging device that charges a surface of the electrophotographic photoreceptor;

an electrostatic charge image forming device that forms an electrostatic charge image on the charged surface of the electrophotographic photoreceptor;

a developing device that develops the electrostatic charge image formed on the surface of the electrophotographic photoreceptor with a developer containing a toner to form a toner image; and a transfer device that transfers the toner image to a surface of a recording medium.

5. The electrophotographic photoreceptor according to claim 1, wherein the charge transport layer has a thickness of 9 μm or greater and 18 μm or less.

6. The electrophotographic photoreceptor according to claim 5, wherein the charge transport layer has a thickness of 9 μm or greater and 15 μm or less.

7. A process cartridge comprising:

the electrophotographic photoreceptor according to claim 6, wherein the process cartridge is attachable to and detachable from an image forming apparatus.

8. A process cartridge comprising:

the electrophotographic photoreceptor according to claim 5, wherein the process cartridge is attachable to and detachable from an image forming apparatus.

9. The electrophotographic photoreceptor according to claim 1, wherein the undercoat layer has a thickness of 19 μm or greater and 31 μm or less.

10. The electrophotographic photoreceptor according to claim 9, wherein the undercoat layer has a thickness of 19 μm or greater and 24 μm or less.

11. A process cartridge comprising:

the electrophotographic photoreceptor according to claim 10, wherein the process cartridge is attachable to and detachable from an image forming apparatus.

12. A process cartridge comprising:

the electrophotographic photoreceptor according to claim 9, wherein the process cartridge is attachable to and detachable from an image forming apparatus.

13. The electrophotographic photoreceptor according to claim 1, wherein a ratio of a thickness of the charge transport layer to a thickness of the undercoat layer (the thickness of the charge transport layer/the thickness of the undercoat layer) is $9/31$ or greater and $18/19$ or less.

14. The electrophotographic photoreceptor according to claim 13, wherein the ratio of the thickness of the charge transport layer to the thickness of the undercoat layer (the thickness of the charge transport layer/the thickness of the undercoat layer) is $9/24$ or greater and $15/19$ or less.

15. A process cartridge comprising:

the electrophotographic photoreceptor according to claim 14, wherein the process cartridge is attachable to and detachable from an image forming apparatus.

16. A process cartridge comprising:

the electrophotographic photoreceptor according to claim 13, wherein the process cartridge is attachable to and detachable from an image forming apparatus.

17. The electrophotographic photoreceptor according to claim 1, wherein the surface organic protective layer has a thickness of 9 μm or greater and 15 μm or less, the charge transport layer has a thickness of 19 μm or greater and 24 μm or less, and a ratio of a thickness of the charge transport layer to a thickness of the surface organic protective layer (the thickness of the charge transport layer/the thickness of the surface organic protective layer) is $9/24$ or greater and $15/19$ or less.

18. A process cartridge comprising:

the electrophotographic photoreceptor according to claim 17, wherein the process cartridge is attachable to and detachable from an image forming apparatus.

19. A process cartridge comprising:

the electrophotographic photoreceptor according to claim 1, wherein the process cartridge is attachable to and detachable from an image forming apparatus.

20. An image forming apparatus comprising:

the electrophotographic photoreceptor according to claim 1;

a charging device that charges a surface of the electrophotographic photoreceptor;

an electrostatic charge image forming device that forms an electrostatic charge image on the charged surface of the electrophotographic photoreceptor;

a developing device that develops the electrostatic charge image formed on the surface of the electrophotographic photoreceptor with a developer containing a toner to form a toner image; and a transfer device that transfers the toner image to a surface of a recording medium.

* * * * *